United States Patent [19]
Katsurahira et al.

[11] Patent Number: 5,682,019
[45] Date of Patent: Oct. 28, 1997

[54] POSITION DETECTING APPARATUS AND POSITION POINTING DEVICE INCLUDING ELAPSED TIME PERIOD BUILD UP DETECTOR

[75] Inventors: Yuji Katsurahira; Yasuji Ogawa, both of Otone-machi, Japan

[73] Assignee: Wacom Co., Ltd., Saitama, Japan

[21] Appl. No.: 491,048

[22] Filed: Jun. 15, 1995

[30] Foreign Application Priority Data

Jun. 20, 1994 [JP] Japan ................... 6-160567

[51] Int. Cl.[6] .................... G08C 21/00; G09G 3/02
[52] U.S. Cl. .................... 178/18; 178/19; 345/176; 345/179
[58] Field of Search .................... 178/18, 19, 20; 345/173, 174, 176, 179

[56] References Cited

U.S. PATENT DOCUMENTS

| | | | |
|---|---|---|---|
| 4,878,553 | 11/1989 | Yamanami et al. | 178/18 |
| 4,999,461 | 3/1991 | Murakami | 178/19 |
| 5,028,745 | 7/1991 | Yamanami | 178/19 |
| 5,214,427 | 5/1993 | Yano | 178/18 |
| 5,434,372 | 7/1995 | Lin | 178/19 |

*Primary Examiner*—Curtis Kuntz
*Assistant Examiner*—Vijay Shankar
*Attorney, Agent, or Firm*—Lowe, Price, LeBlanc & Becker

[57] ABSTRACT

A position detecting apparatus is equipped with a sense section including a plurality of loop coils arranged parallel to each other along a position detecting direction. The plurality of loop coils are selected in turn by an electric-wave transmission unit to transmit an electric wave. The apparatus is further provided with a position pointing section having a resonance circuit composed of at least one coil and a capacitor. A time-measuring device measures a time period elapsed until a signal developing in the resonance circuit reaches a predetermined level after the electric-wave transmission unit starts the electric-wave transmission.

7 Claims, 9 Drawing Sheets

POSITION DETECTING APPARATUS AND POSITION POINTING DEVICE INCLUDING ELAPSED TIME PERIOD BUILD UP DETECTOR

BACKGROUND OF THE INVENTION

1. Field of the Invention

The present invention relates generally to a position detecting apparatus making use of the electromagnetic coupling, and a position pointing device thereof.

2. Description of the Prior Art

Prior to this application, as described in Japanese Patent Application NO. 61-213970, the applicant has proposed an position detecting apparatus which makes the transmission and reception of an electric wave, between a sense section of a tablet and a position pointing device, obtain a coordinate value of a position on the tablet pointed by the position pointing device. This apparatus is equipped with a plurality of loop coils placed within the tablet and arranged in parallel to each other along a position detecting direction, the plurality of loop coils being selected in turn to transmit an electric wave and receiving an electric wave re-transmitted from a resonance circuit provided in the position pointing device. Thereby seeking a loop coil which develops the strongest reception signal, to detect a coordinate position of the position pointing device. In such a position detecting apparatus, it is common that the strength of a signal from a loop coil adjacent to the loop coil of the strongest reception signal is detected to make a positional interpolation between the loop coils so as to improve the position detection accuracy.

There is a problem which arises with such a conventional system, however, in that the electric wave to be received is weak. For example, when a flat type display unit such as a pen computer is installed, the display unit is extremely restricted by noises and its structure becomes too complicated for removing the noises from the reception signal. This is because the error in the strength of the detection signal directly causes the error in the position detection in making the interpolation between the loop coils.

BRIEF SUMMARY OF THE INVENTION

It is therefore an object of the present invention to provide a high-accuracy position detecting apparatus and position pointing device which have a strong resistance against noises coming from the external concurrent, with a simple structure.

To accomplish the above-mentioned object, according to this invention, there is provided a position detecting apparatus comprising a sense section including a plurality of loop coils arranged in parallel to each other along a position detecting direction; electric-wave transmission means for selecting one of the plurality of loop coils in turn transmit an electric wave; a position pointing section having a resonance circuit composed of at least a coil and a capacitor; and time-measuring means for measuring the time period elapsed until a signal developing in the resonance circuit reaches a predetermined level after the electric-wave transmission means starts to transmit the electric wave.

Further, there is provided a position detecting apparatus with a position pointing device, including a resonance circuit composed of at least a coil and a capacitor to detect a coordinate position of the position pointing device by using an electromagnetic induction with a tablet, in which; the position pointing device comprising timing information transmission means for detecting a time that a signal developing in the resonance circuit reaches a predetermined level, and for informing the tablet side of the detected time, and the tablet comprising timing information reception means for receiving timing information transmitted from the timing information transmission means to the tablet, and time-measuring means for measuring a time period elapsed until the timing information reception means detects the time after the electric-wave transmission means starts to transmit an electric wave.

As an example, the timing information transmission means may change a resonance characteristic of the resonance circuit when a signal developing in the resonance circuit of the position pointing device reaches a predetermined level or when a predetermined time elapsed after the time of reaching the predetermined level, and the tablet may receive the electric wave transmitted from the position pointing device to detect the time that the reception signal varies.

Preferably, in a position detecting apparatus, loop coils for transmitting the electric wave may be arranged to be orthogonal to loop coils for receiving the electric wave, or the electric wave is received by a loop coil made to wholly surround plural loop coils for transmitting the electric wave.

In addition, according to this invention there is provided a position pointing device comprising of a resonance circuit made up of at least a coil and a capacitor, timing detecting means for detecting a time when a signal developing in the resonance circuit reaches a predetermined level; and means for changing a resonance characteristic of the resonance circuit at one of the detected times or the time elapsed after a predetermined time period from the detected time.

Preferably, the position pointing device further comprises a rectifier for rectifying an alternating current voltage developing in the resonance circuit to obtain a power supply.

When an electric wave is transmitted from a loop coil, a signal generates in the resonance circuit of the position pointing device and gradually becomes stronger. This rise time depends on the distance from the loop coil. Accordingly, by measuring the time elapsed until the signal developing in the resonance circuit reaches a predetermined level after the electric-wave transmission starts, it is possible to obtain the distance between the position pointing device and the loop coil in accordance with a previously known relationship.

The resonance circuit itself serves as a narrow-band filter which is not subjected to noises, and since a relatively strong signal develops, a signal detection unaffected by noises is allowed by directly measuring the signal. In addition, since the time that the signal developing in the resonance circuit of the position pointing device reaches a predetermined level is transmitted to the tablet side, a cord between the position pointing device and the tablet is not required ( a cord between the position pointing device and the tablet). Moreover, with the transmission loop coil and the reception loop coil being arranged to be orthogonal to each other, it is possible to prevent the interference therebetween. With the reception loop coil being arranged to surround the entire transmission loop coil, there is no need for the switching of the reception loop coil. Furthermore, since the signal developing in the resonance circuit is rectified to make a power supply, no battery is required in the position pointing device.

This and the other objects, features and advantages of the invention will become more apparent upon reading the following detailed specification and drawings.

In the first aspect of the present invention, a position detecting apparatus comprises:

a sense section including a plurality of loop coils arranged parallel to each other along a position detecting direction;

electric-wave transmission means for selecting one of the plurality of loop coils in turn to transmit an electric wave;

a position pointing section having a resonance circuit composed of at least a coil and a capacitor; and time-measuring means for measuring a time period elapsed until a signal developing in the resonance circuit reaches a predetermined level after the electric-wave transmission means starts to transmit the electric wave.

In the second aspect of the present invention, a position detecting apparatus provided with a position pointing device comprises:

a resonance circuit composed of at least a coil and a capacitor to detect a coordinate position of the position pointing device by using an electromagnetic induction with a tablet, in which;

position pointing device comprising timing information transmission means for detecting a time that a signal developing in the resonance circuit reaches a predetermined level, and for informing the tablet side of the detected time; and the tablet comprising timing information reception means for receiving timing information transmitted from the timing information transmission means to the tablet; and time-measuring means for measuring the time period elapsed until the timing information reception means detects the time after the electric-wave transmission means starts to transmit an electric wave.

Here, the timing information transmission means may changes a resonance characteristic of said resonance circuit when a signal developing in the resonance circuit of the position pointing device reaches a predetermined level elapsed after the time of reaching the predetermined level, and the tablet receives the electric wave transmitted from the position pointing device to detect the time that the reception signal varies.

Here, loop coils for transmitting the electric wave may be arranged to be orthogonal to loop coils for receiving the electric wave.

Here, the electric wave may be received by a loop coil made to wholly surround the plurality of loop coils for transmitting the electric wave.

In the third aspect of a position pointing device comprises:

a resonance circuit composed of at least a coil and a capacitor;

timing detecting means for detecting a time that a signal developing in the resonance circuit reaches a predetermined level; and means for changing a resonance characteristic of the resonance circuit at one of the detected times or the time elapsed after a predetermined time period from the detected time.

Here, a rectifier for rectifying an alternating current voltage developing in the resonance circuit may obtain a power supply.

BRIEF DESCRIPTION OF THE DRAWINGS

A preferred form of the present invention is illustrated in the accompanying drawing in which.

DETAILED DESCRIPTION OF THE PREFERRED EMBODIMENT

Figure 1:
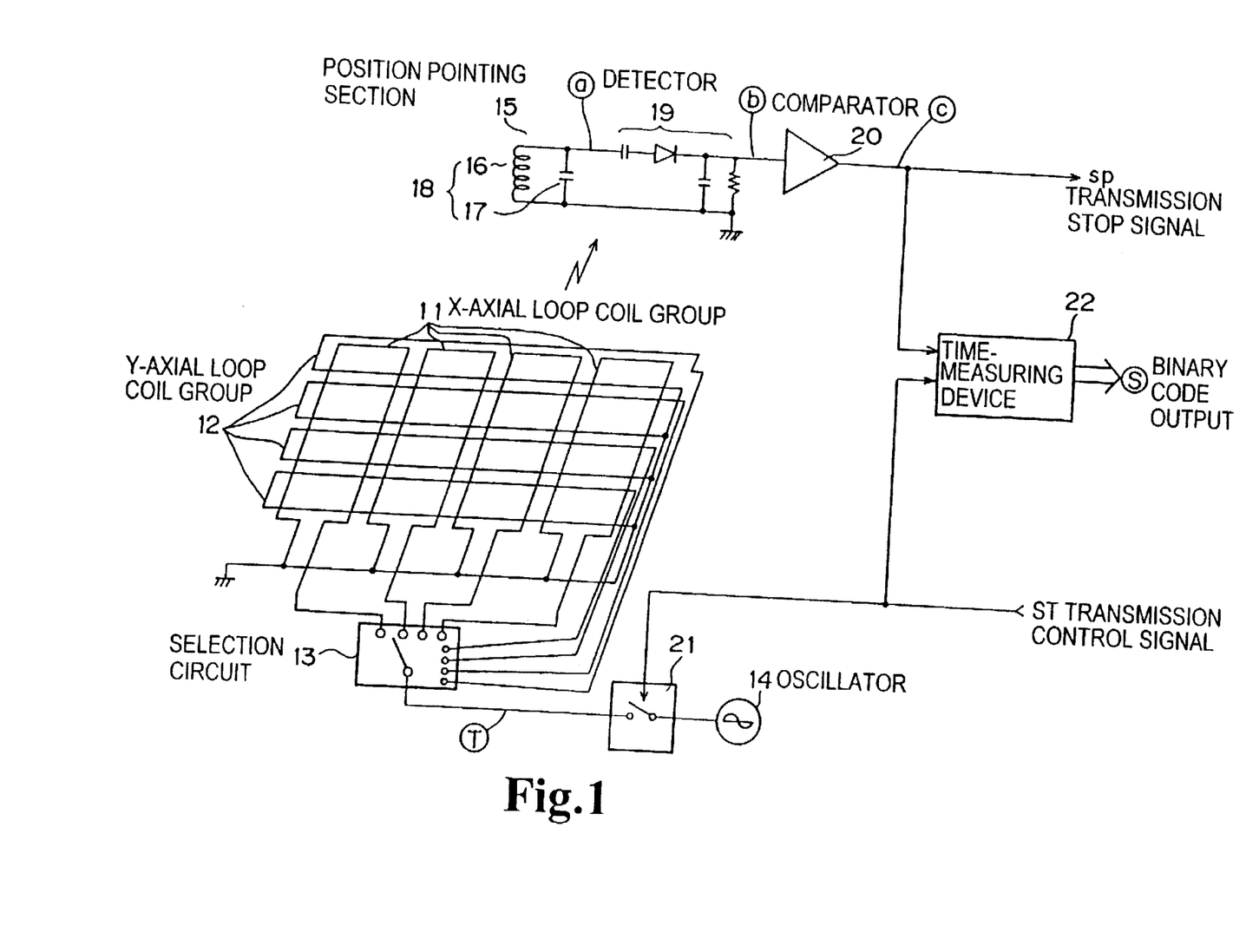
FIG. 1 is a schematic illustration showing an arrangement of a first embodiment of a position detecting apparatus according to this invention.

A description will be made with reference to the drawings in terms of embodiments of the present invention. FIG. 1 is an illustration showing an arrangement of a first embodiment of a position detecting apparatus according to this invention. As shown in FIG. 1, on a position detecting surface of this embodiment, a group of loop coils 11 are provided and arranged in parallel (side by side) to each other along the X-axial directions, and a group of loop coils 12 are arranged in parallel to each other along the Y-axial directions. Here, although in FIG. 1 the four loop coils are illustrated in each of the X-axial and Y-axial directions, these loop coils constitute a part of the whole loop-coil arrangement. The groups of loop coils of loop coils 11, 12 are respectively connected to an electric wave transmission means comprising of a selection circuit 13 and an oscillator 14. Each of the loop coils, in turn selected by the selection circuit 13, transmits an electric wave in response to the supply of an alternating current (AC) signal from the oscillator 14.

A position pointing section 15 includes a resonance circuit 18 comprising of an electromagnetic induction coil 16 and a resonance capacitor 17, and when the position pointing section 15 approaches the selected loop coil, the resonance circuit 18 resonates with the frequency of the electric wave transmitted from the selected loop coil. To the resonance circuit 18 there is connected a detector 19 the output of which is inputted into a comparator 20. The comparator 20 delivers a signal when the input from the detector 19 exceeds a predetermined threshold level.

Between the selection circuit 13 and oscillator 14 there is interposed a switch 21 which comes into the ON state in response to the transmission of a transmission control signal st so that the alternating current signal from the oscillator 14 is supplied through the selection circuit 13 to the loop coils.

Reference numeral 22 represents a time-measuring device to which the transmission control signal st and the output of the comparator 20 are inputted. The time-measuring device 22 measures the time from the rise of the transmission signal st to the rise of the comparator 20 output and converts the measured time into a binary code before outputting it. Further, the output of the comparator 20 is used as a transmission stop signal sp which stops the transmission control signal st and puts the switch 21 into the OFF state, thereby stopping the electric-wave transmission.

Figure 2:
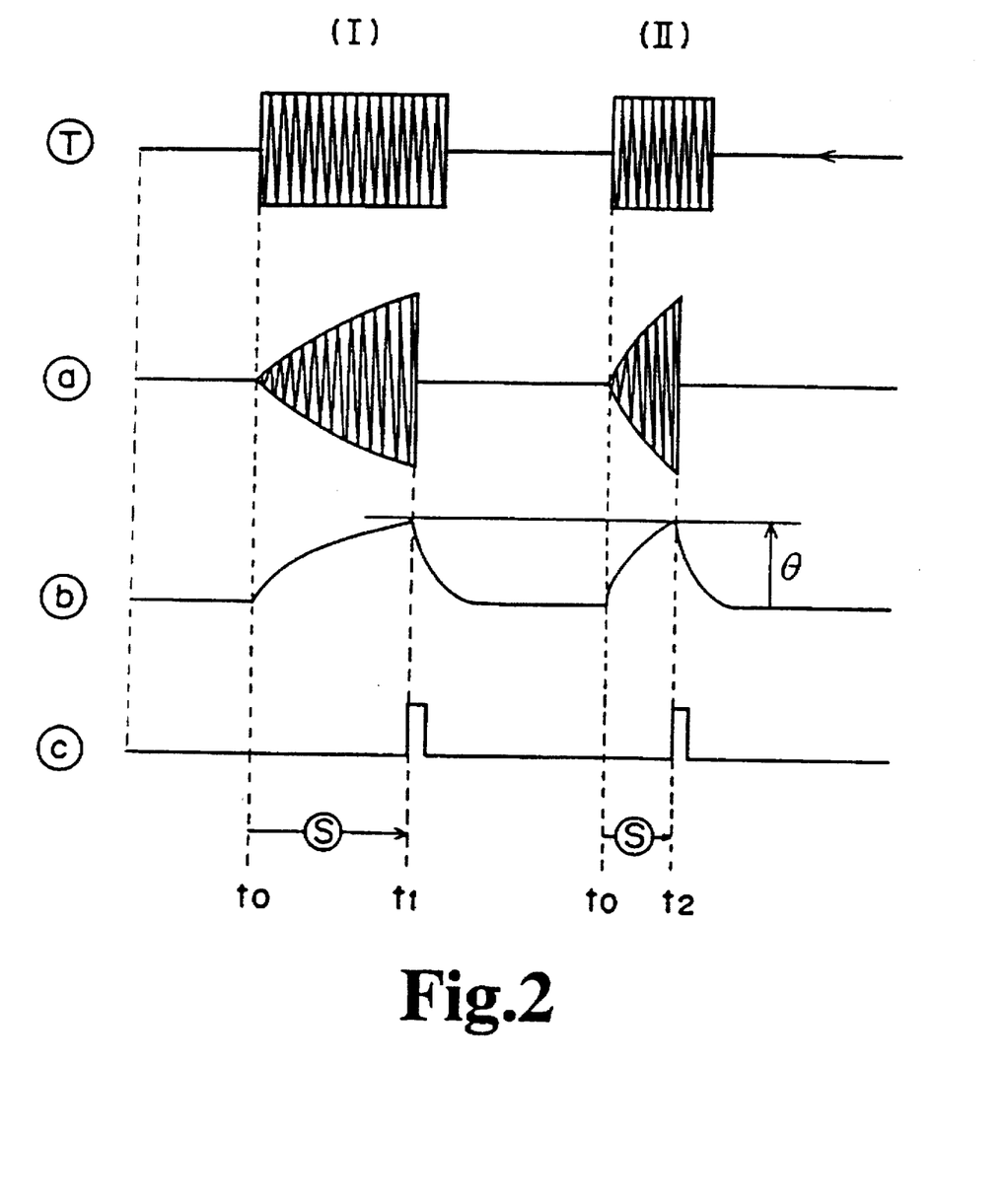
FIG. 2 shows waveforms at parts of the FIG. 1 apparatus.

FIG. 2 is an illustration of waveforms at parts in FIGS. 1. In FIG. 2, reference T designates a current flowing through the selected loop coil, reference a denotes a signal developed in the resonance circuit 18 of the position pointing section 15; reference b depicts a signal after detection of the signal a, reference c stands for the output signal of the comparator 20, and reference S indicates the time measured by the time-measuring device 22.

For the issue of the transmission, the signal from the oscillator 14 is coupled through the switch 21 to one loop coil selected by the selection circuit 13 so that the current of the signal T flows therein. Here, when the position pointing section 15 is placed within a short distance of the selected loop coil, the resonance circuit 18 produces the signal a which is in turn detected to become the signal b and then inputted into the comparator 20. The comparator 20, as described before, outputs the signal c when the signal b exceeds a predetermined threshold level $\theta$. This signal c is supplied to the time-measuring device 22 and further used as the transmission stop signal sp so as to stop the electric wave transmission from the loop coil.

In FIG. 2, reference (I) shows waveforms produced when the position pointing section 15 is relatively separated from the loop coil, and (II) illustrates waveforms developed with the position pointing section 15 being relatively close the loop coil. As shown in FIG. 2, the signal a slowly rises when the selected loop coil is distant from the position pointing section 15, and more sharply rises as the selected loop coil becomes closer the selected loop coil. Accordingly, the time taken until the signal a developing in the resonance circuit 18 reaches a given constant level after the start of the electric-wave transmission starts to become shorter as the selected loop coil becomes closer to the position pointing section 15. In the (I) waveform, the time corresponds to the time from $t_0$ to $t_1$, and in the (II) waveform, it means the time from $t_0$ to $t_1$. The time-measuring device 22 outputs a binary code signal over the time period S.

Here, the distance between the selected loop coil and the position pointing section 15 is in a certain proportional relation to the time required for the signal a to reach a given level, the proportional relation being repeatable. As a result, the distance between the loop coils 12 and the position pointing section 15 is obtainable as a function of the time for the signal a reaching the given level, using a predetermined quantitative proportional relationship therebetween.

Figure 9:
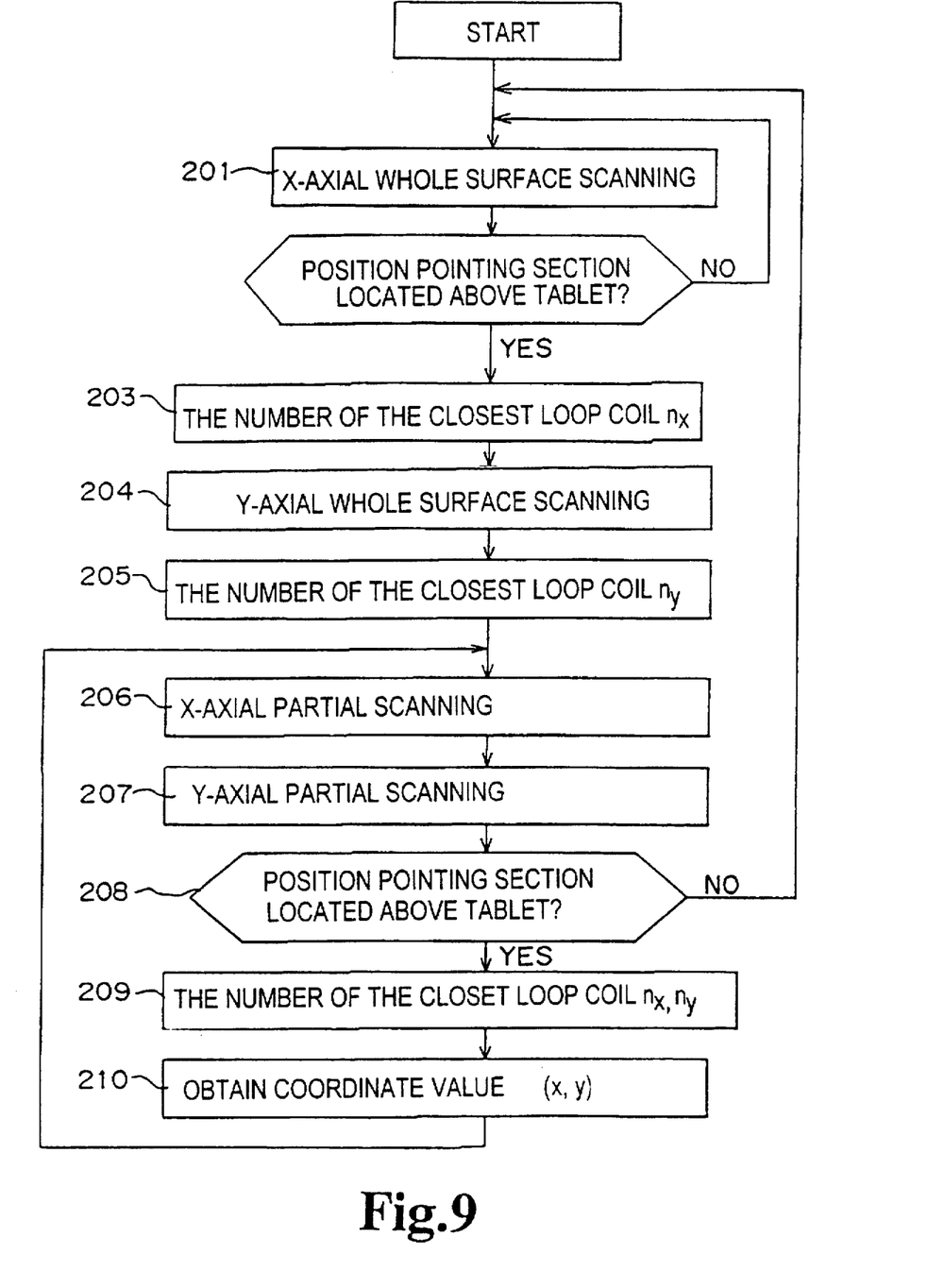
FIG. 9 is a flow chart for obtaining a coordinate value in the position detecting apparatus according to this invention.

A description in terms of a position detection by this embodiment will follow. FIG. 9 is a flow chart showing a program stored in a processing circuit (not shown) in the FIG. 1 arrangement. As shown in FIG. 9, the whole surface is first scanned in the X-axial directions (step 201) so as to find the number of the closest loop coil of the X-axial loop coil group 11 to the position pointing section 15 (step 203). The selection circuit 13 in turn selects the loop coils of the X-axial loop coil group 11 in order to cause them to emit electric waves as described above. At this time, when the position pointing section 15 is relatively separated from the selected loop coil, even if the electric wave is transmitted for a given time period or more, a signal hardly develops in the resonance circuit 18 and the output signal of the comparator 20 does not appear. Thus, when the output of the comparator does not appear even if a given time period elapses after the issue of the transmission control signal st, the processing circuit, not shown, is made to stop the issue of the transmission control signal st, thereby stopping the electric wave transmission. Then, after time elapses so that the signal of the resonance circuit 18 attenuate, the selection circuit 13 selects the next loop coil to repeatedly perform the same operation.

On the other hand, with the position pointing section 15 being within a relatively short distance of the selected loop coil, the output signal b of the detector 19 reaches a predetermined threshold level within the above-mentioned given time period, so that the output signal of the comparator 20 develops. In response to the output signal of the comparator 20 being produced within the given time period, the electric-wave transmission immediately stops as described above. Thereafter, the selection circuit 13 selects the next loop coil to allow the electric-wave transmission when the time elapses such that the signal of the resonance circuit 18 attenuate.

If the position pointing section 15 approaches the position detecting surface, in terms of at least three loop coils adjacent to each other, the output signal b of the detector 19 reaches a predetermined threshold within the given time period, thereby producing the output signal of the comparator 20. Of these loop coils, the middle loop coil is stored as the number $n_x$ (step 203). Further, in a case where none the loop coils of the X-axial loop coil group 11 cause the output signal of the comparator 20 to appear within the given time period, a decision is made such that the position pointing section 15 is not above the tablet (position detecting surface), thus repeatedly executing the step 201. If, with the whole surface being scanned in the X-axial directions, the output signal of the comparator 20 is produced within the given time period in terms of at least three loop coils, the X-axial scanning is followed by the Y-axial scanning of the entire surface (step 204). That is, the Y-axial loop coil group 12 are selected and managed in the same manner as described before so that, of the loop coils of the Y-axial loop coil group 12, the closest loop coil to the position pointing section 15 is stored as the number $n_y$ (step 206).

Secondly, a partial scanning is made in order to obtain a correct coordinate value at a high speed (steps 206 to 210). First of all, the partial scanning is performed along the X-axial directions (step 206). This is done such that some of the loop coils (for example, five loop coils) centering the loop coil of the number $n_x$ stored in the previous step 203 are selected in turn so as to be managed in the same manner as affected for the X-axial whole surface scanning in the step 201. Here, since it is known that the position pointing section 15 is within a short distance of the number $n_x$ loop coil, in the steps 201 to 203 the number $n_x$ loop coil is centrally partial-scanned, and hence at least three loop coils cause the output signal of the comparator 20 to be produced within the given time period.

Moreover, a partial scanning is made along the Y-axial directions (step 207). This is made such that some of the loop coils (for example, five loop coils) centering the loop coil of the number $n_y$ stored in the previous step 205 are selected in turn so as to be managed in the same manner as affected for the Y-axial whole surface scanning in the step 204. Here, since it is known that the position pointing section 15 is within a short distance of the number $n_y$ loop coil, in the steps 204 to 205 the number $n_x$ loop coil is centrally partial-scanned, and therefore at least three loop coils cause the output signal of the comparator 20 to be produced within the given time period.

When, in the step 206 or 207, the number of the loop coils which allows the generation of the output signal of the comparator 20 within the given time period is less than three, a decision is made such that the position pointing section 15 is separated from above the tablet, and hence the operational flow returns to the step 201 (step 208). On the other hand, when, in the step 206 or 207, the number of the loop coils which allows the generation of the output signal of the comparator 20 within the given time period is three or more, the loop coil causing the shortest time which is measured by the time-measuring device 22 is re-stored as the number $n_x$ or $n_y$ (step 209).

Furthermore, when the number $n_x$, $n_y$ loop coils and the loop coils adjacent thereto are selected, a process to obtain the coordinate value, pointed by the position pointing section 15, on the basis of the time measured by the time-measuring device 22, is executed in accordance with the following procedure (step 210). Assuming that the time measured by the time-measuring device 22 in the selection of the number $n_x$ loop coil is taken to be Spx, the time measured by the time-measuring device 22 in the selection of the number $n_{x+1}$ loop coil is taken as Sax, the time measured by the time-measuring device 22 in the selection of the number $n_{x+1}$ loop coil is taken as Sbx, and the distance between the X-axial loop coils is Dx. The following equation is first calculated.

$$(Dx/2)\cdot\{(Sax-Sbx)/(Sax+Sbx-2\cdot Spx)\} \qquad (1)$$

This value lies in the range from $-D/2$ to $D/2$ depending on the position of the position pointing section 15. When this value assumes zero, Sax becomes equal to Sbx. This means that the position pointing section 15 is right above the number $n_x$ loop coil. Further, when this value takes $-D/2$, Sax becomes equal to Spx. That is, the position pointing section 15 is located between the number $n_x$ loop coil and the number $n_{x+1}$ loop coil. Moreover, when this value takes $D/2$, Sbx becomes equal to Spx. This proves that the position pointing section 15 is placed between the number $n_x$ loop coil and the number $n_{x+1}$ loop coil. Thus, obtained in accordance with this equation, the value can be employed as a correction value representative of the degree of the distance between the position pointing section 15 and the center of the number $n_x$ loop coil. Since the center positions of the respective loop coils and the distance Dx between the loop coils are known in advance, it is possible to obtain a correct X-axial coordinate value of the position pointing section 15 in accordance with the above-described relationship. In addition, a Y-axial coordinate value is similarly obtainable (step 210).

Furthermore, the following equation is calculated where the time measured by the time-measuring device 22 in the selection of the number $n_y$ loop coil is taken to be Spy, the time measured by the time-measuring device 22 in the selection of the number $n_{y-1}$ loop coil is taken as Say, the time measured by the time-measuring device 22 in the selection of the number $n_{y+1}$ loop coil is indicated as Sby, and the distance between the Y-axial loop coils is expressed as Dy.

$$(Dy/2)\cdot\{(Say-Sby)/(Say+Sby-2\cdot Spy)\} \qquad (2)$$

On the basis of the center position of each loop coil, the distance Dy between the loop coils, and the result of the this equation, it is possible to obtain a correct Y-axial coordinate value of the position pointing section 15. After the coordinate value is obtained, the operational flow returns to the step 206 to execute the steps 206 to 210 in order to trace the movement of the position pointing section 15. At this time, for tracing the movement of the position pointing section 15, in the steps 206 and 207 the partial scanning is centrally made to the loop coils of the numbers $n_x$, $n_y$ restored in the previous step 209.

As described above, according to this embodiment, the time elapsed from the electric-wave transmission to the fact that the signal of the resonance circuit 18 reaches the given level is detected to obtain the distance between the loop coil and the position pointing section 15 as a function of the detected time to thereby get the coordinate position. A correct position detection is possible without being subject to noises coming externally. That is, since the resonance circuit 18 itself of the position pointing section 15 serves as a narrow-band filer, it is extremely unaffected by noise. In addition, since a relatively strong signal develops, the direct measurement of this signal makes possible the signal detection proof against noises.

Figure 3:
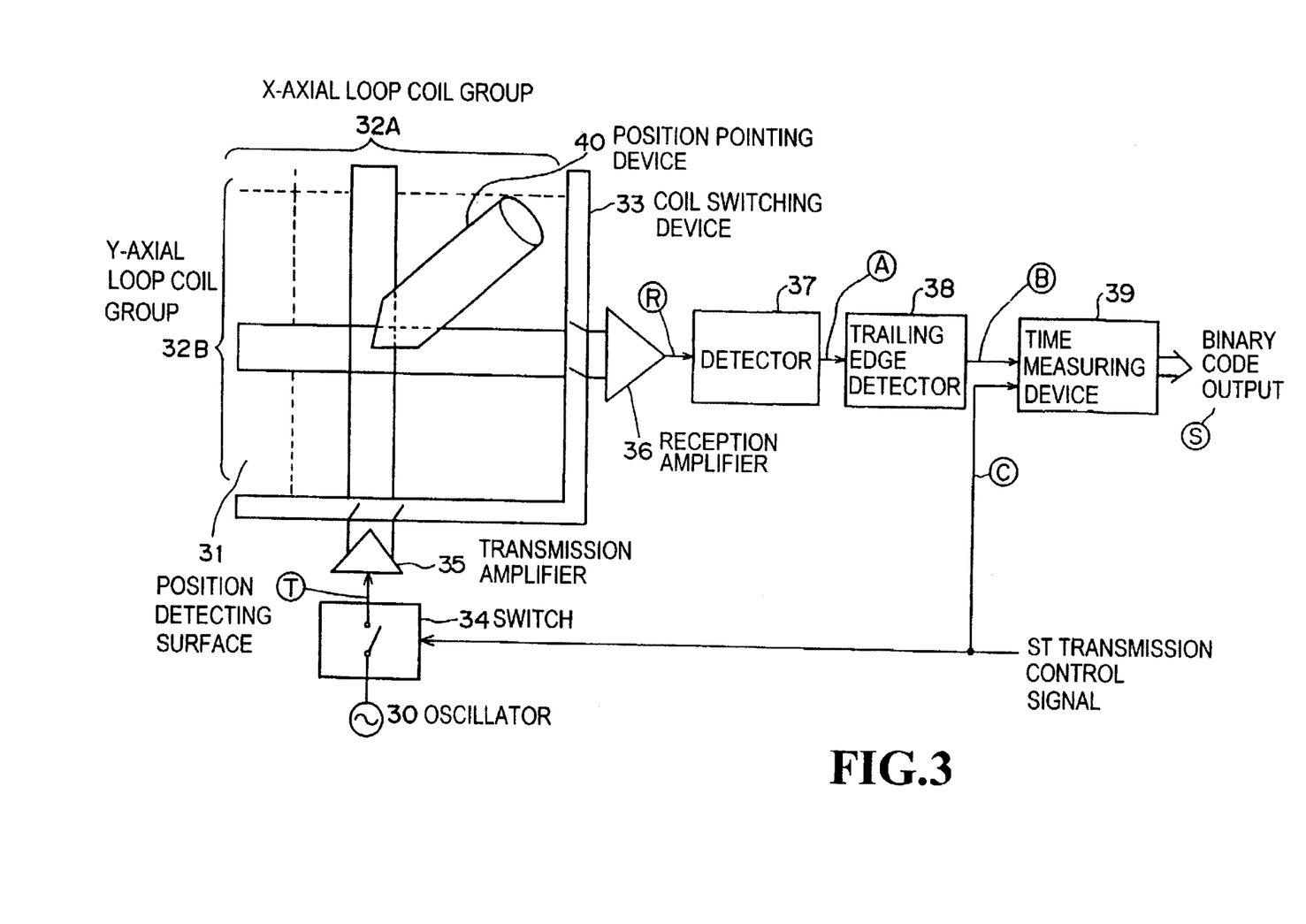
FIG. 3 is a schematic illustration showing a table-side arrangement of a second embodiment of a position detecting apparatus according to this invention.
Figure 4:
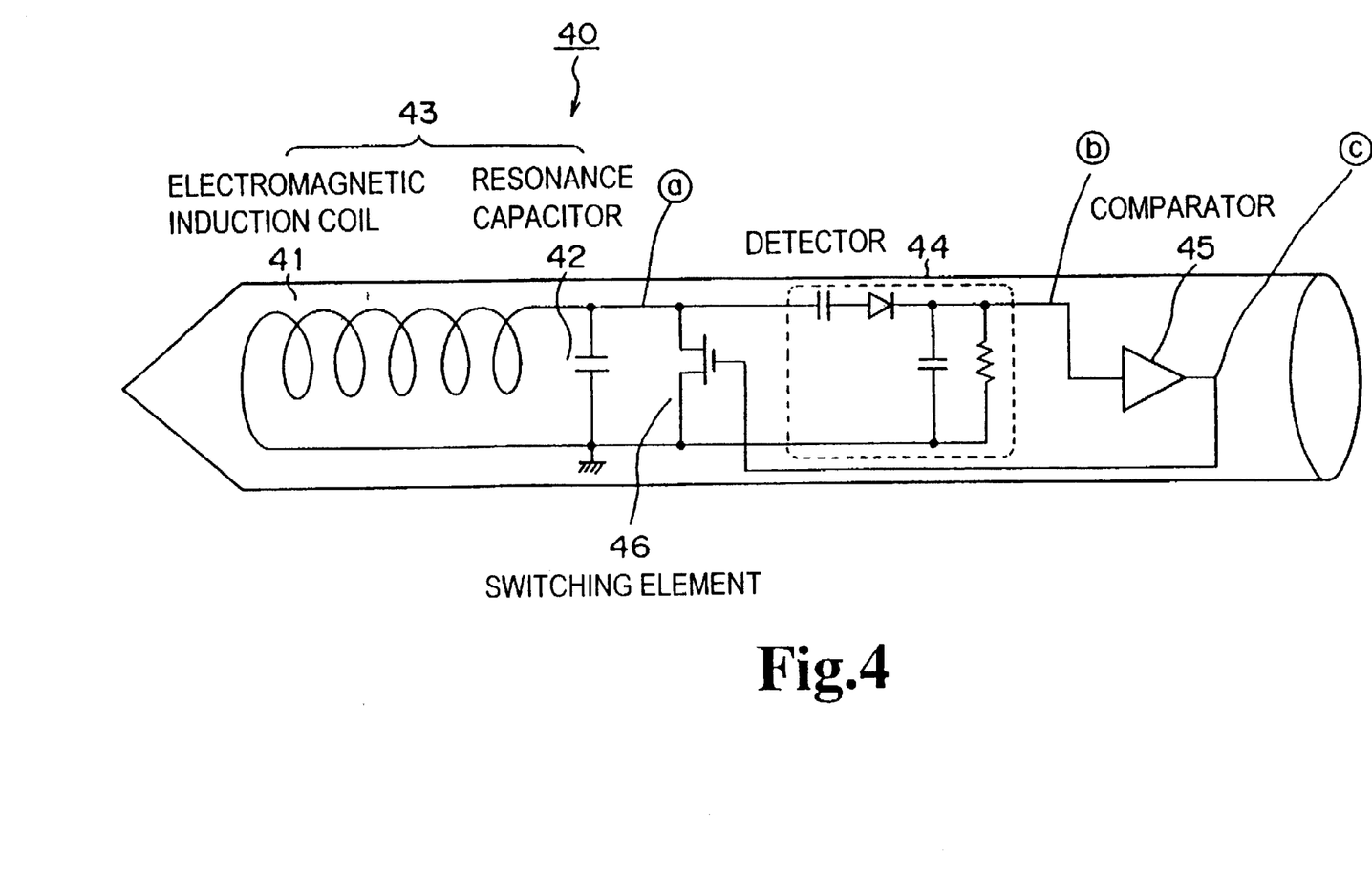
FIG. 4 is a schematic illustration showing an arrangement of a position pointing device for use in a tablet shown in FIG. 3.

FIG. 3 is an illustration of a tablet-side arrangement of a second embodiment according to this invention, and FIG. 4 is an illustration of an arrangement of a position pointing device to be used in the second embodiment. In FIG. 3, on a tablet-side position detecting surface 31 there are provided a group of a number of loop coils 32A arranged parallel to each other along first position detecting directions (X-axial directions), and a group of a number of loop coils 32B arranged parallel to each other along second position detecting directions (Y-axial directions) and orthogonal to the group of the loop coils 32A. In FIG. 3, only one of the loop coils arranged along each of the X- and Y-axial directions is shown.

A coil switching device 33 is connected to the X-axial loop coil group 32A and further to the Y-axial loop coil group 32B. One loop coil is selected from the X-axial loop coil group 32A and one loop coil is also selected from the Y-axial loop coil group 32B. One of them is connected to a transmission amplifier 35 and the other is connected to a reception amplifier 36. Here, when the X-axial loop coil is connected to the transmission amplifier 35, the Y-axial loop coil is connected to the reception amplifier 36. On the other hand, when the Y-axial loop coil is connected to the transmission amplifier 35, the X-axial loop coil is connected to the reception amplifier 36.

An oscillator 30 generates an alternation current signal with a given frequency, which is coupled through a switch 34 to the transmission amplifier 35, whereby an electric wave with the given frequency is transmitted from the loop coil (transmission coil), connected to the transmission amplifier 35, in accordance with the timing of a transmission control signal st. Further, the loop coil, connected to the reception amplifier 36, receives the electric wave returning from a position pointing device 40 and the reception amplifier 36 amplifies the reception signal. The output of the reception amplifier 36 is inputted to a detector 37 the output of which is in turn inputted to a trailing edge detector 38. Subsequently, the output of the trailing edge detector 38 is inputted to a time-measuring device 39. This trailing edge detector 38 outputs a pulse signal when the level of the output signal of the detector 37 rapidly falls. In addition, to the time-measuring device 39 there is inputted the transmission control signal st which controls the timing of the electric-wave transmission. The time-measuring device 39 measures the time from the rise of the transmission control signal st to the rise of the output of the trailing edge detector 38, and then converts the measured time into a binary code before outputting it.

On the other hand, the position pointing device 40, as illustrated in FIG. 4 is equipped with a resonance circuit 43 comprising of an electromagnetic induction coil 41 and a resonance capacitor 42. This resonance circuit 43 is made to match with the frequency of the electric wave transmitted from the tablet side. To the resonance circuit 43 there is connected a detector 44 the output of which is inputted into a comparator 45. This comparator 45 delivers a signal when the input from the detector 44 exceeds a predetermined threshold level. In addition, a switching element 46 is provided parallel to the capacitor 42 of the resonance circuit 43, and the output of the comparator 45 is coupled thereto. When a signal developing in the resonance circuit 43 reaches a predetermined fixed level and the output of the comparator 45 appears, the switching element 46 is closed so as to change the resonance characteristic of the resonance circuit 43. These comparator 45 and switching element 46 make up a timing information transmission means which, as will be described later, informs the tablet side of the time that the signal produced in the resonance circuit 43 reaches the predetermined level.

Figure 5:
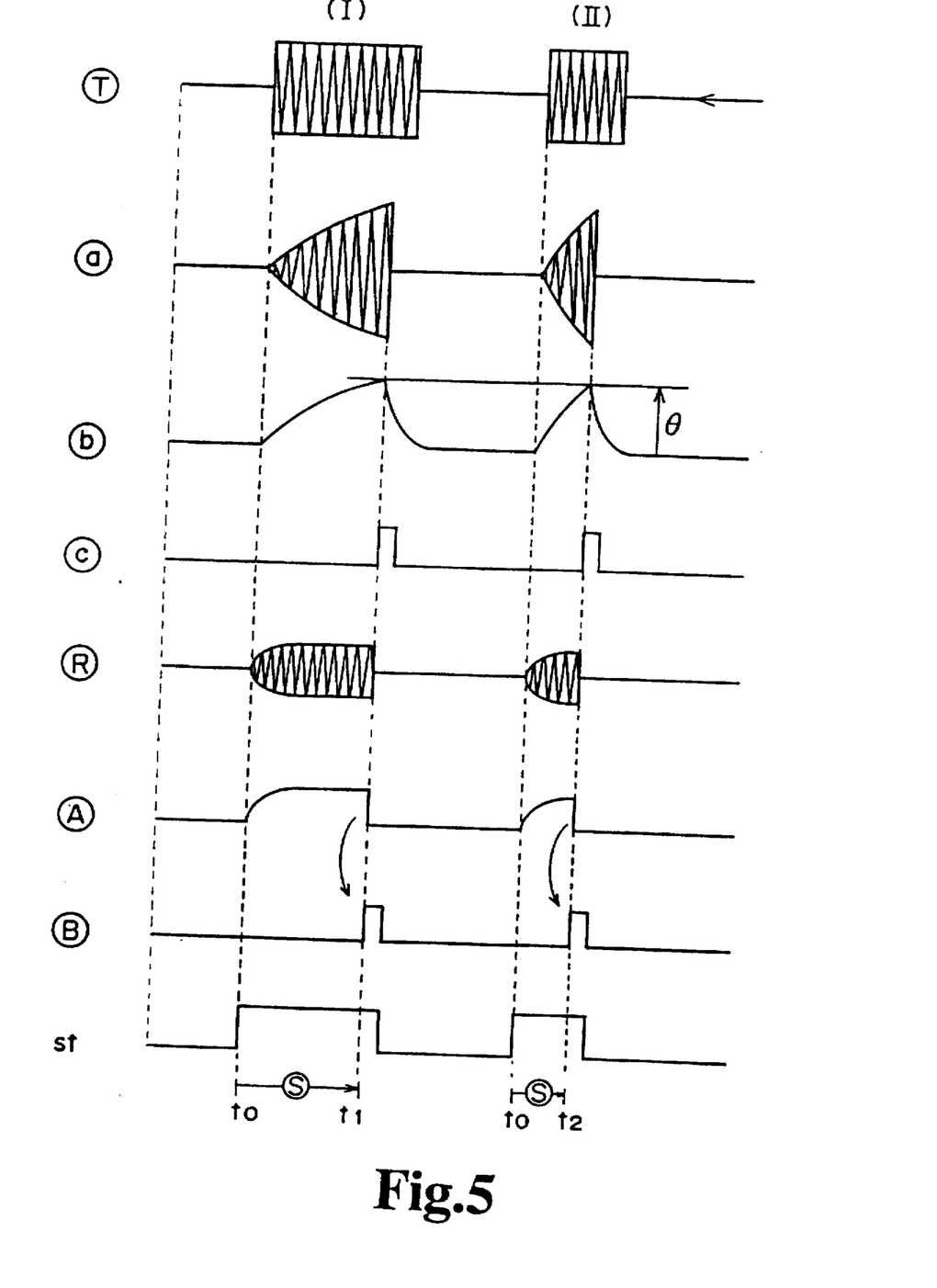
FIG. 5 illustrates waveforms at parts shown in FIGS. 3 and 4.

FIG. 5 illustrates waveforms at parts in FIG. 4. In FIG. 5, reference T designates a current flowing through the tablet-side transmission coil, reference a denotes a signal developing in the resonance circuit 43, reference b represents a signal after the detection of the signal a, reference c stands for an output signal of the comparator 45, reference R depicts an output signal of the tablet-side reception amplifier 36, and reference A indicates a signal after the detection of the signal R. Further, reference B represents an output signal of the trailing edge detector 38, reference st stands for a transmission control signal, and reference S designates the time measured by the time-measuring device 39. As well as in FIG. 2, in FIG. 5, (I) shows waveforms produced when the position pointing section 40 is relatively separated from the transmission loop coil, and (II) illustrates waveforms developed with the position pointing section 40 being relatively close thereto.

As shown in FIG. 5, like the embodiment described above, the comparator 45 Generates a signal when the signal b exceeds a predetermined threshold level θ, whereby the switching element 46 is operated to establish a short-circuit across the resonance circuit 43. This means that the signal a across the resonance circuit 43 disappears. On the other hand, the reception loop coil receives the electric wave transmitted from the resonance circuit 43 of the position pointing device 40, the reception signal being amplified to the signal R. Namely, the signal a developing in the resonance circuit 43 of the position pointing device 40 permits the electric wave corresponding to its level, and therefore the tablet-side reception loop coil detects a signal with the same waveform as that of the signal a. When amplified in the reception amplifier 36, this signal is saturated at a fixed level so as to be turned to the signal R.

When, within the position pointing device 40, the switching element 46 establishes a short-circuit across the resonance circuit 43 at the time of the rise of the output signal c of the comparator 45, the signal R simultaneously disappears at the tablet side, and the output signal A of the detector 37 falls. The falling timing of signal A after the detection is detected by the trailing edge detector 38, which in turn generates the signal B to be inputted to the time-measuring device 39. In addition, the transmission control signal st stops in response to the detection of the rise of the signal B.

Therefore, as well as the above-described embodiment, the time S measured by the time-measuring device 39 corresponds to the time from the start of the electric-wave transmission to the time that the signal developing in the resonance circuit 43 of the position pointing device 40 reaches a predetermined level, which depends on the distance between the transmission loop coil and the position pointing device 40. The binary code output of the time-measuring device 39 is supplied to a processing circuit, not shown, where the distance between the transmission loop coil and the position pointing device 40 is obtained on the basis of the length of the time S.

A description will be made below in terms of the position detection by this embodiment. This embodiment also performs the coordinate detection in accordance with the same processes as shown in FIG. 9. In the FIG. 3 arrangement, a program flowing as shown in FIG. 9 is stored in the unshown processing circuit.

The whole surface is first scanned in the X-axial directions (step 201) so as to find the number of the closest loop coil of the X-axial loop coil Group 32A to the position pointing section 40. In this embodiment the X-axial whole surface scanning method slightly differs from that of the first embodiment. The coil switching device 33 first selects one of the Y-axial loop coil Group 32B in turn and connects it to the reception amplifier 36. During the time period that the one reception loop coil is selected, the coil switching device 33 in turn selects one of X-axial loop coil Group 32A and connects it to the transmission amplifier 35, whereby electric waves are successively transmitted from the X-axial loop coils. Here, when a X-axial loop coil (transmission loop coil) connected to the transmission amplifier 35 and a Y-axial loop coil (reception loop coil) connected to the reception amplifier 36 is relatively separated from the position pointing device 40, a signal hardly develops in the resonance circuit 43 irrespective of the transmission of the electric wave for a Given time period or more, and the reception signal R also does not develop in the tablet side with no Generated signals A and B. Accordingly, when the signal B is not detectable in the tablet side even if a given time period elapses after the supply of the transmission control signal st, the unshown processing circuit stops the supply of the transmission control signal st to stop the electric-wave transmission. Subsequently, after waiting for the time period allowing the signal of the resonance circuit 43 to attenuate, the selection circuit 33 selects the next loop coil as a transmission loop coil for repeatedly affecting the similar operation.

When both the X-axial loop coil (transmission loop coil) connected to the transmission amplifier 35 and Y-axial loop coil (reception loop coil) connected to the reception amplifier 36 are located relatively close to the position pointing device 40, like the first embodiment, with at least three loop coils used as the transmission loop coils and adjacent to each other, the output signal b of the detector 44 of the position pointing device 40 reaches a predetermined threshold level within the given time period so that the output signal of the comparator 45 rises, and at the same time the switching element 46 is closed within the given time period. In response to this, in the tablet side the signal R is produced which will disappear within the give time period. When such a signal is detected, the middle loop coil of the transmission loop coils at the time is stored as the number $n_x$ (step 203). Furthermore, the above-mentioned process is effected for all the combinations of the X-axial loop coil group 32A and the Y-axial loop coil 32B, and when, in terms of at least three transmission coils adjacent to each other, the output signal B of the trailing edge detector 38 does not appear within the given time period, a decision is made such that the position pointing device 40 is not above the table (position detecting surface), the step 201 is repeatedly executed.

On the other hand, when, with the X-axial whole surface scanning, the output signal of the trailing edge detector 38 appears within the given time period in terms of at least three loop coils, the Y-axial whole surface scanning is subsequently performed (step 204). That is, the number $n_x$ loop coil stored in the step 203 is selected and connected to the reception amplifier 36, and one is in turn selected from the Y-axial loop coil group 32B and connected to the transmission amplifier 35, thereby accomplishing the electric-wave transmission. At this time, in terms of three transmission loop coils adjacent to each other, the output signal b of the detector 44 of the position pointing device 40 reaches a predetermined threshold level so that the output signal of the comparator 45 rises and, simultaneously with this, the switching element 46 is closed within the given time period. In response to this, in the tablet side the signal R develops which will disappear within the given time period. When such a signal is detected, the middle loop coil of the transmission loop coils is stored as the number $n_y$.

Secondly, a partial scanning is performed in order to obtain a correct coordinate value at a high speed (steps 206 to 210). This operation is the same as that in the first embodiment, in that for the X-axial partial scanning (step 206) the loop coils of the number $n_y$ stored previously is connected to the reception amplifier 36, and some of loop coils (for example, five loop coils) centering the number $n_x$ X-axial loop coil, serving as the transmission loop coils, are selected in turn. In addition, for the Y-axial partial scanning (step 207), the loop coil of the number $n_x$ stored previously is connected to the reception amplifier 36, and some of the loop coils (for example, five loop coils) centering the number $n_y$ Y-axial loop coil are selected in turn. Whereupon, like the first embodiment, a correct coordinate value is obtainable in accordance with the above-mentioned equations (1) and (2).

As described above, according to this embodiment, the time that the signal developing in the resonance circuit of the position pointing device reaches a predetermined level is detected and supplied to the tablet side and also the tablet side the time period elapsed from the electric-wave transmission to that time is measured for the position detection. Thus, in addition to the effect of the above-described first embodiment, this embodiment does not require the cord between the position pointing device and the tablet.

Although in the position pointing device 40 a short-circuit across the resonance circuit 43 is made at the time that the signal developing in the resonance circuit 43 reaches a predetermined level, it is also appropriate that a short-circuit across the resonance circuit 43 is made when a given time passes after that time. In this case, since the short-circuit across the resonance circuit 43 is made at the time that the signal developing in the resonance circuit 43 becomes stronger than a predetermined detection level, the reception signal in the tablet side also becomes stronger by a corresponding level. This allows the signal detection to be still more unaffected by noise.

In addition, according to this embodiment, for the timing information transmission means to inform the tablet side of the time that the signal developing in the resonance circuit 43 reaches a predetermined level, an arrangement is employed which changes the resonance characteristic of the resonance circuit 43 at a required time. More specifically, the short-circuit across the resonance circuit 43 is made by using the switching element 46 put in parallel to the capacitor Thus, since the signal is transmitted to the tablet side with the signal developing in the resonance circuit 43 being lost, it is possible to report the time to the tablet side with a simple arrangement.

The arrangement to change the resonance characteristic is not limited to the above-mentioned arrangement. It is also possible to vary the resonance frequency instead. Moreover, in this invention the timing information transmission means to inform the tablet side of the time that the signal produced in the resonance circuit 43 reaches a predetermined level is not limited to the type of changing the resonance characteristic. It is also appropriate to make the transmission by using an electric wave with a different frequency.

Furthermore, according to this embodiment the loop coils for transmitting an electric wave are arranged to be orthogonal to the loop coils for receiving the electric wave, and hence the mutual interference between the transmission loop coil group 32A and the reception loop coil group 32B can be reduced so that it is possible to strongly receive the electric wave from the position pointing device 40.

Figure 6:
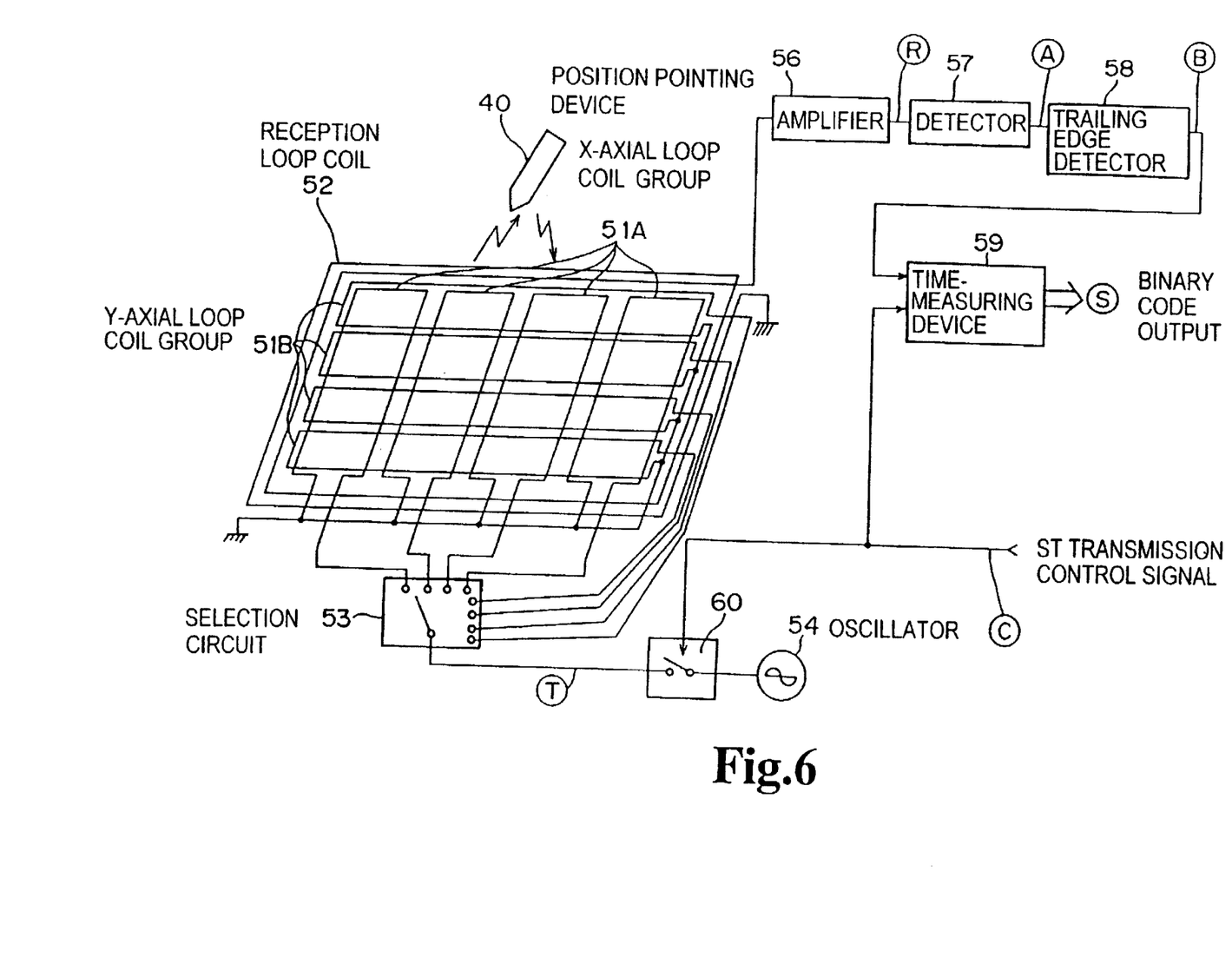
FIG. 6 is a schematic illustration showing a tablet-side arrangement of a third embodiment of a position detecting apparatus according to this invention.

FIG. 6 is an illustration showing an arrangement of a position detecting apparatus according to a third embodiment of this invention. This embodiment features electric-wave reception loop coils that are arranged so as to wholly surround electric-wave transmission loop coils. As shown in FIG. 6, at the tablet side there are provided a group of loop coils 51A arranged parallel to each other along X-axial directions, a group of loop coils 51B (only four loop coils are illustrated in FIG. 6) arranged parallel to each other along Y-axial directions, and an electric-wave reception loop coil 52 entirely surrounding the groups of loop coils 51A, 51B. A selection circuit 53 selects one loop soils from the X-axial loop coil group 51A and the Y-axial loop coil group 51B and couples it, through a switch 60, to an alternating current signal from an oscillator 54. Thus, an electric wave is transmitted from the selected loop coil, whereby a signal is generated in a resonance circuit 43 of a position pointing device 40. Further, an electric wave is re-transmitted from the position pointing device 40 and received by the reception loop coil 52. The other arrangements are the same as those in the above-described second embodiment, where the reception signal of the reception loop coil 52 is amplified by an amplifier 56 the output of which is inputted through a detector 57 and a trailing edge detector 58 into a time-measuring device 59. In addition, to the time-measuring device 59 there is also inputted a transmission control signal st for a switch 60 which controls the timing of the electric-wave transmission. It is possible to use, as the position pointing device 40, the arrangement shown in FIG. 4.

In this embodiment, the waveforms at parts are the same as those in FIG. 5. The effect of the above-described first embodiment, this embodiment makes it also possible to omit the cord between the position pointing device 40 and the tablet in this embodiment. Moreover, since the electric wave is received with the electric-wave reception loop coil made to wholly surround the X-axial loop coil group 51A and the Y-axial loop coil group 51B, as compared with the second embodiment there is no need for the reception-side loop coil being switched, which can simplify its arrangement.

Similarly, this embodiment uses the FIG. 9 flow chart in order to obtain the coordinate value like the above-described second embodiment. The difference from the second embodiment is that the loop coil connected to the amplifier 56 (corresponding to the reception amplifier 36 in the second embodiment) is of a fixed type because of no need for switching. Like the first and second embodiments, it is possible to obtain a correct coordinate value in accordance with the equations (1) and (2).

Figure 7:
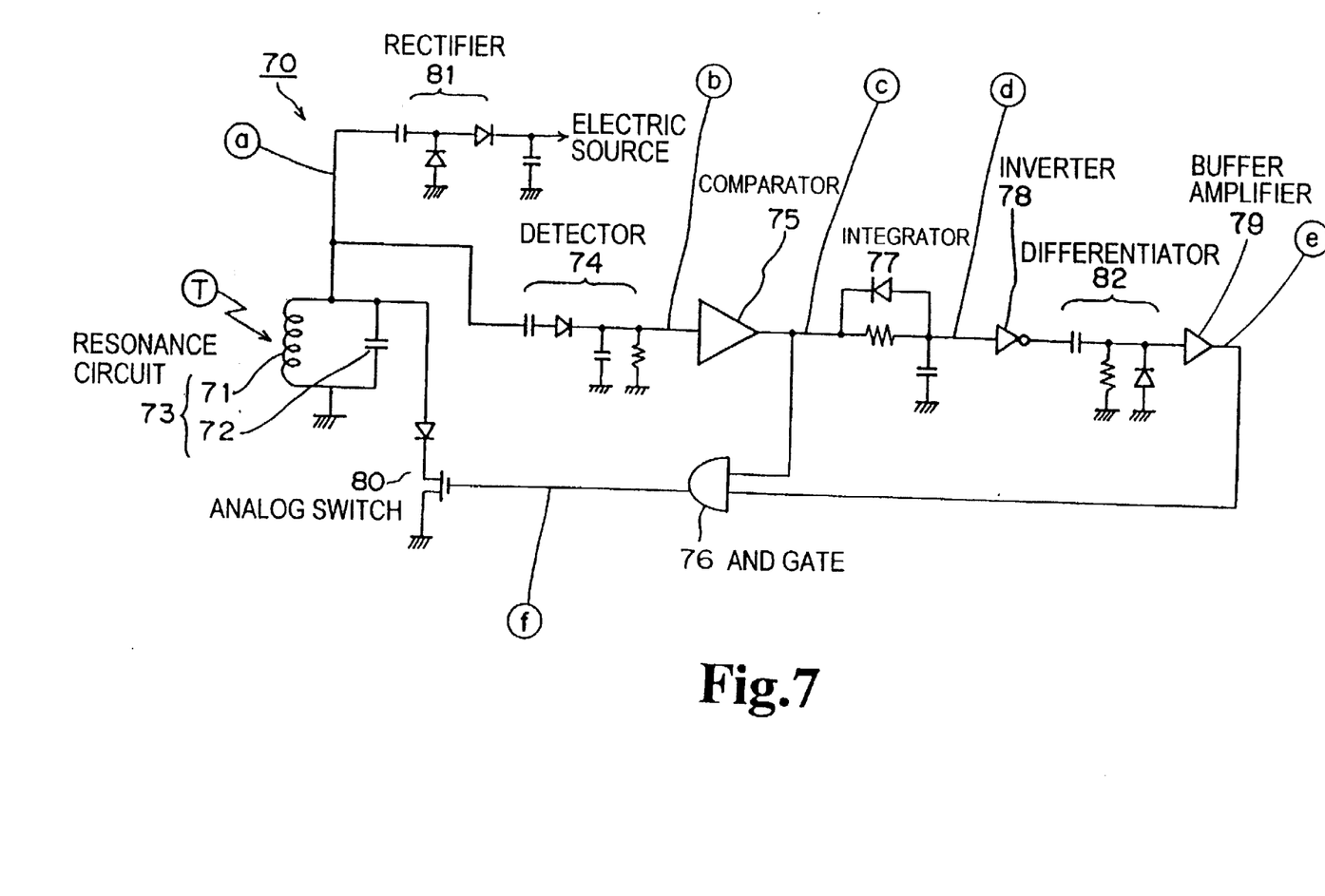
FIG. 7 is a schematic illustration showing a further embodiment of a position pointing device according to this invention.

FIG. 7 is an illustration showing an arrangement of a further embodiment of a position pointing device according to this invention. This position pointing device, like the position pointing device shown in FIG. 4, is used in corporation with a separate table shown in FIGS. 3 and 6. As illustrated in FIG. 7, this position pointing device 70 is equipped with a resonance circuit 73 comprising of an electromagnetic induction coil 71 and a resonance capacitor 72. The resonance 73 resonates with the frequency of the electric wave from the side of a separate tablet (for example, FIG. 3 or 6), not shown. In FIG. 7, numeral 74 represents a detector and numeral 75 designates a comparator. The comparator 75 outputs a signal when the input from the detector 74 exceeds a predetermined threshold level. The output of the comparator 75 is branched: one being inputted into an AND gate 76 and the other being inputted through an integrator 77, inverter 78, differentiator 82, buffer amplifier 79 and so on to the AND gate 76. The output of the AND gate 76 is coupled to an analog switch 80 placed parallel to the capacitor 72 of the resonance circuit 73. Furthermore, the resonance circuit 73 is also connected to a rectifier 81 so as to get a direct current voltage from the alternating current voltage developing in the resonance circuit 73. This direct current voltage is used to power the respective active elements of the position pointing device 70.

Figure 8:
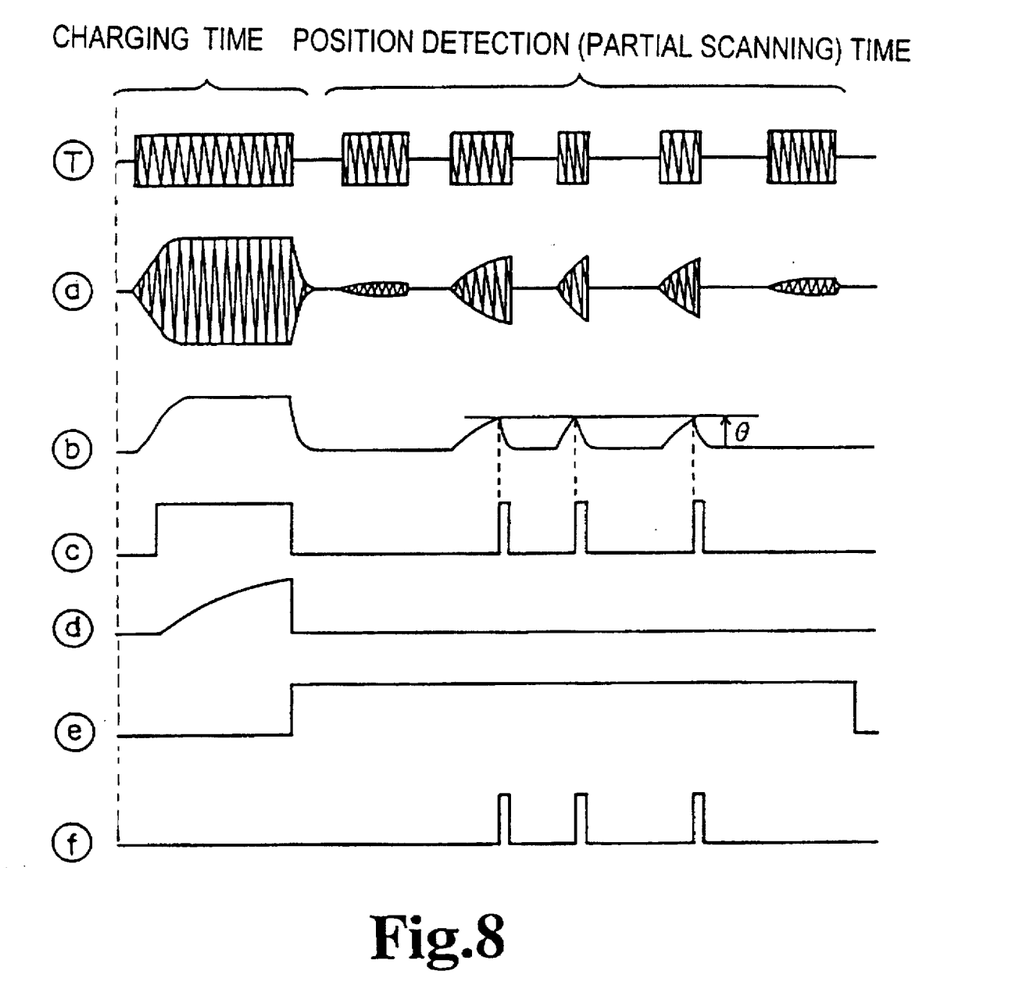
FIG. 8 shows waveforms at parts shown in FIG. 7.

FIG. 8 shows waveforms at parts in FIG. 7. In FIG. 8, reference T designates an electric wave signal received by the position pointing device 70, reference a denotes a signal developing in the resonance circuit 73, reference b depicts a signal after the detection of the signal a, reference c stands for the output signal of the comparator 75, reference d the output of the integrator 77, reference e indicates the output of the buffer amplifier 79, and reference f represents the output of the AND gate 76.

As illustrated in FIG. 8, in this position pointing device 70, prior to the partial scanning for the position detection, the tablet side transmits an electric wave for a given time period or more so as to charge the power supply. When both the output signal c of the comparator 75 and the output signal e of the buffer amplifier 79 are in the high-levels, the analog switch 80 is turned on, thereby separating the charging time period for the power supply and the time period for the position detection. In response to the analog switch 80 coming into the ON state, like the position pointing device 40 shown in FIG. 4, the signal which is developing in the resonance circuit 73 disappears. This is reported to the tablet, not shown. The time measurement to be made for the position detection afterwards is similar to that of the above-described embodiment. Since this position pointing device 70 is arranged such that a power supply is made with the alternating current voltage developing in the resonance circuit 73 being rectified by the rectifier 81, this position pointing device 70 does not require a special power supply such as a battery, whereby it is possible to simplify its arrangements as well as to reduce its cost.

According to this invention, as described above in detail with reference to the embodiments, the rise time of the signal developing in the resonance circuit of the position pointing device is measured in order to obtain the distance between the position pointing device and the loop coil for the detection of a coordinate value. Thus, it is possible to provide a position detecting apparatus which is capable of simplifying its arrangement and performing the position detection with a high precision without being affected by noises.

As many apparently widely differing embodiments of this invention may be made without departing from the spirit and scope thereof, it is to be understood that the invention is not limited to the specific embodiments thereof except as defined in the appended claims.

What is claimed is:

1. A position detecting apparatus comprising:
   a sense section including a plurality of loop coils arranged parallel to each other along a position detecting direction;

electric-wave transmission means for selecting one of said plurality of loop coils in turn to transmit an electric wave;

a position pointing device having a resonance circuit composed of at least a coil and a capacitor; and time-measuring means for measuring a time period elapsed until a signal developing in said resonance circuit reaches a predetermined level after said electric-wave transmission means starts to transmit said electric wave.

2. A position detecting apparatus provided with a position pointing device including a resonance circuit composed of at least a coil and a capacitor to detect a coordinate position of said position pointing device by using an electromagnetic induction with a tablet, in which:
   said position pointing device comprising timing information transmission means for detecting a time that a signal developing in said resonance circuit reaches a predetermined level, and for informing the tablet side of the detected time; and said tablet comprising timing information reception means for receiving timing information transmitted from said timing information transmission means to said tablet; and time-measuring means for measuring the time period elapsed until said timing information reception means detects the time after an electric-wave transmission means starts to transmit an electric wave.

3. A position detecting apparatus as claimed in claim 2, wherein said timing information transmission means changes a resonance characteristic of said resonance circuit when a signal developing in said resonance circuit of said position pointing device reaches a predetermined level or when a predetermined time elapsed the time of reaching said predetermined level, and said tablet receives said electric wave transmitted from said position pointing device to detect the time that the reception signal varies.

4. A position detecting apparatus as set forth in claim 3, wherein loop coils for transmitting said electric wave are arranged to be orthogonal to loop coils for receiving said electric wave.

5. A position detecting apparatus as set forth in claim 3, wherein said electric wave is received by a loop coil made to wholly surround the plurality of loop coils for transmitting said electric wave.

6. A position pointing device comprising:
   a resonance circuit composed of at least a coil and a capacitor;

timing detecting means for detecting a time that a signal developing in said resonance circuit reaches a predetermined level; and means for changing a resonance characteristic of said resonance circuit at one of the detected time or the time elapsed after a predetermined time period from the detected time.

7. A position pointing device as claimed in claim 6, further comprising a rectifier for rectifying an alternating current voltage developing in said resonance circuit to obtain a power supply.

* * * * *